Dec. 17, 1929.                B. BURVENICK                1,740,223
                 DEVICE FOR MIXING AND STRAINING LIQUIDS
                         Filed May 28, 1929
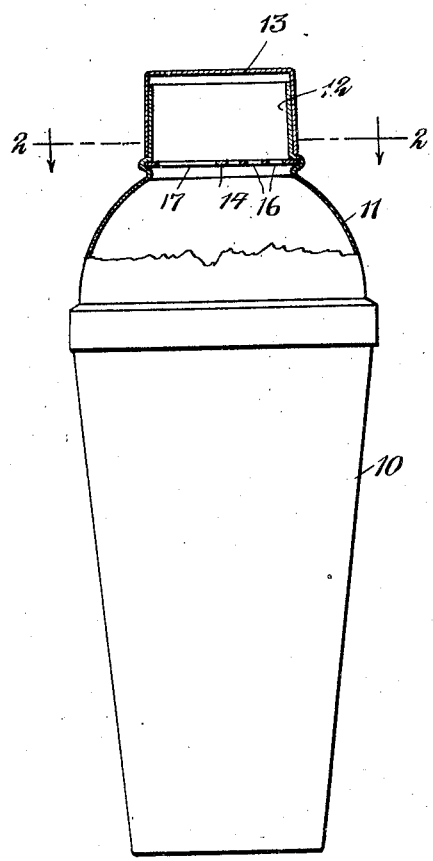
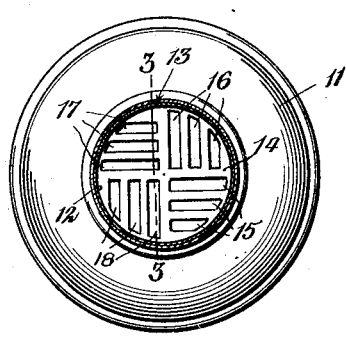
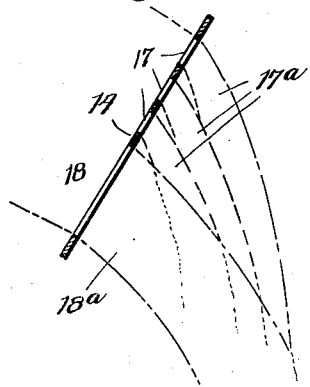
INVENTOR
B. Burvenick
BY
ATTORNEY
WITNESSES Patented Dec. 17, 1929

1,740,223

UNITED STATES PATENT OFFICE

BENJAMIN BURVENICK, OF WOODHAVEN, NEW YORK, ASSIGNOR TO LALANCE AND GROSJEAN MANUFACTURING COMPANY, OF WOODHAVEN, NEW YORK, A CORPORATION OF NEW YORK

DEVICE FOR MIXING AND STRAINING LIQUIDS

Application filed May 28, 1929. Serial No. 366,620.

This invention relates to a device for mixing and straining liquids, and refers more particularly to an improvement in beverage mixers.

The invention broadly comprehends a device for mixing and straining liquids which consists of a wall slotted in such a manner as to cause the liquids when poured therethrough to be subdivided into converging intersecting streams for the purpose of insuring a uniform mixture of liquids when poured into separate receptacles, this being particularly essential where the liquid ingredients tend to rapidly separate.

More specifically, the invention contemplates in a device of the character described, a wall which is slotted in such a manner as to cause the liquids poured therethrough to be subdivided into angularly disposed intersecting streams which are of substantially elongated cross sectional configuration so that the streams cut into each other and prevent separation of the ingredients due to stratification.

As a further object, the invention embodies a device for mixing and straining liquids poured therethrough which is constructed of a nickel chromium alloy metal, the nature of which metal in a device of this character resists denting and scratching and the chemical action of fruit juices, eggs, milk or other acid containing substances.

Other objects of the invention reside in its simplicity of construction, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of a beverage mixer with parts broken away and shown in section.

Figure 2 is a sectional view taken approximately on the line indicated at 2—2 in Figure 1.

Figure 3 is an enlarged sectional view of the mixing and straining plate, diagrammatically illustrating the manner in which the liquids poured therethrough intermix.

Referring to the drawings by characters of reference, 10 designates the body of the mixing vessel having the removable upper section 11 which is formed with the reduced neck 12 over which the removable cap 13 is arranged. At the juncture of the pressed portion of the removable section 11 with the neck 12, a straining and mixing device 14 is provided which is in the nature of a disk or plate. The plate or disk 14 is formed with portional areas, preferably of quadrantal configuration, each of which is provided with a row of parallel slots designated respectively at 15, 16, 17 and 18. The slots of adjacent portions extend at a right angle to each other so that the major axes of one set of slots being disposed at an angle to the major axes of the adjacent slots will subdivide the liquids poured therethrough into the intersecting streams 17ª and 18ª, as illustrated in Figure 3. It thus follows that separation or stratification of the liquid ingredients will be overcome during the pouring operation to insure uniform mixture of the ingredients when the same are poured into separate receptacles.

In practice, the plate or device 14, as well as the remaining elements of the mixer, will be constructed of nickel chromium alloy metal, which by test has been found to be three times as strong as steel and of a hardness which effectually resists denting and scratching. In addition, this metal is not affected by the chemical reaction of fruit juices or acid containing substances, thereby rendering the device safe for storing and mixing beverages. It is also readily cleaned and will not flake off, as is the case with plated materials. In addition, the hardness of the metal makes for a very smooth fit between the sections and renders the same easy to assemble and disassemble.

What is claimed is:

1. A device for mixing and straining liquids poured therethrough, including a disk like member having quadrantal portions thereof, each provided with a row of parallel slots, the slots of adjacent portions extending at right angles to each other.

2. A device for mixing and straining liquids poured therethrough, including a plate having portional areas provided respectively with slots, the major axes of which slots are disposed at relatively different angles, whereby the liquid streams flowing from said slots intersect and intermix with each other.

3. A mixing strainer for liquids including portions having elongated openings, the major axes of the elongated openings of one portion disposed at an angle to the major axes of the openings of an adjacent portion.

Signed at Woodhaven in the county of Queens and State of New York this 25th day of May, A. D. 1929.

BENJAMIN BURVENICK.